US006459158B1

United States Patent
Delprat et al.

(10) Patent No.: US 6,459,158 B1
(45) Date of Patent: Oct. 1, 2002

(54) VERTICALLY-TOLERANT ALIGNMENT USING SLANTED WALL PEDESTAL

(75) Inventors: Daniel Delprat, Vulaines/Seine (FR); Manuel Fendler, place du General de Gaulle (FR); Anatolie Lupu, Fontainebleau (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/929,550

(22) Filed: Aug. 14, 2001

(51) Int. Cl.[7] .................. H01L 23/48; H01L 23/52; H01L 29/40
(52) U.S. Cl. .................. 257/777; 257/685; 257/686; 257/723; 257/724; 257/730; 257/731
(58) Field of Search .................. 257/685, 686, 257/723, 724, 730, 731, 777

(56) References Cited

U.S. PATENT DOCUMENTS

| | | | |
|---|---|---|---|
| 5,532,519 A | * 7/1996 | Bertin et al. ........ | 257/777 |
| 5,866,443 A | 2/1999 | Pogge et al. ........ | 438/110 |
| 6,087,199 A | 7/2000 | Pogge et al. ........ | 438/106 |
| 6,114,221 A | * 9/2000 | Tonti et al. ........ | 438/455 |
| 6,188,138 B1 | * 2/2001 | Bodo et al. ........ | 257/778 |

OTHER PUBLICATIONS

Self–Aligned Optical Flip–Chip OEIC Packaging Technologies Institute of Quantum Electronics Hunziker, et al Dec. 9, 1993.

Passive Self–Aligned Low–Cost Packaging of Semiconductor Laser Arrays on Si Motherboard IEEE Photonics Tech. Letters 7/95 No. 11 Hunziker, et al.

A novel micromaching technology for multilevel structures of silicon Bao, et al State Key Laboratories of Transducer Technology Sep. 19, 1996.

Maskless etching of three–dimensional silicon structures in KOH XP000681221.

Hybrid integration onto silicon motherboards with planar silica waveguides XP00068747.

* cited by examiner

Primary Examiner—David L. Talbott
Assistant Examiner—David A. Zarneke
(74) Attorney, Agent, or Firm—Juliana Agon

(57) ABSTRACT

An apparatus (10, 310) is provided including a first chip having at least one recess (18, 418) formed on the first chip, in the form of an optoelectronic/photonic device (12, 314), at a pre-selected location. A second chip, in the form of an optical component supporting substrate (14, 312), includes at least one projection (24, 424) extending therefrom at a pre-selected location, wherein at least one of the recess and the projection includes angled walls (28, 428) having an angle relative to the top of the wall less than 54.74° for capturing and directing the other of the at least one recess (18, 418) and the at least one projection (24, 424) for aligning the first chip to the second chip.

8 Claims, 3 Drawing Sheets

VERTICALLY-TOLERANT ALIGNMENT USING SLANTED WALL PEDESTAL

BACKGROUND OF THE INVENTION

1. Technical Field

The present invention generally relates to optoelectronic/photonic devices and, more particularly, to a method and apparatus for passively aligning, tacking, and bonding an optoelectronic/photonic device with a matching substrate.

2. Background

Photonic component hybridization concerns integrating optical components on a substrate or a platform with optoelectronic/photonic devices. This technology involves electrically and mechanically bonding or otherwise assembling the optoelectronic/photonic device with the optical components (e.g. waveguides, lasers, SOAs, etc.) on the substrate. A fundamental issue in photonic component hybridization is the accurate positioning of the device relative to the substrate which typically requires accuracy within one micrometer (1 $\mu$m) for proper optical coupling. One key point for such in-line hybridization is to obtain a precise alignment of the optical waveguides of the different components. Past attempts to ensure such positioning accuracy include active and passive alignment techniques but the 1 $\mu$m precision accuracy is difficult to achieve.

A widely used passive alignment technique involves the use of flip-chip solder bonding for packaging of optoelectronic components to optical waveguides. This method completely relies on the solder surface tension and the design of the wettable pads to align the waveguides to the optoelectronic components. In this bonding sequence, a chip (e.g., the device) with a plurality of solder bumps formed thereon is roughly aligned over a substrate using a pick and place machine, the temperature of the assembly is then raised above the solder melting temperature, and, upon the solder melting, surface tension appears at all interfaces which moves the chip to the lowest potential energy point which corresponds to alignment with the substrate. Once the chip is aligned, the solder is cooled.

Passive alignment techniques range in accuracy due to variations in the solder bonding process. Current dimensional accuracy requirements for photonic component hybridization is about 0.5 micrometers in the X, Y, and Z directions. As such, the uncertainty in alignment accuracy of this technique makes it unsuitable for photonic assemblies.

To eliminate the dependency of alignment accuracy on the solder bonding process, several techniques employing stops, standoffs, pedestals, registration features, fiducials, or other projections of varying shapes coupling with receiving recesses have been employed. For example, the chip to be attached has projections that are inserted into recesses on the substrate in a precisely fitted fashion, or vice a versa, as seen in FIG. 1. In FIG. 1, the substrate 114 to be attached has projections 124 that are inserted into recesses 18 on the chip 12 in a precisely fitted fashion. The absolute positioning of the chip guiding structure relies on the lateral (X-direction) alignment between the optical waveguides with the assembly (fiducial) marks formed on the chip as pairs of trenches or recesses 18. Additionally, the vertical (Z-direction) or height (h) alignment 113 relies on a proper positioning of the chip on the corresponding silicon slanted pedestal of the receiving substrate. The dimensional accuracy of the projections and the recesses is determined either by lithography or by micro-milling or micro-drilling tolerances, typically less than one micrometer. The precise lateral positioning is easier obtained due to the assembly scheme of pairs of recesses on top of corresponding pairs of pedestals or projections precisely located by the photo-lithography definition. However, in the vertical direction, there is a given uncertainty related to the fabrication of the recesses or holes and the slant of the pedestals. For typical silicon pedestals where (1,1,1) oriented sidewalls 128 are developed with an angle of 54.74°, a horizontal opening, lateral recess inaccuracy, or width tolerance $\Delta W$ of +/−2 $\mu$m translates to a vertical variation or height error $\Delta h$ of +/−1.48 $\mu$m. For the coupling of an active optical component, such as a laser chip, with a single mode fiber, this vertical positioning inaccuracy does not reliably minimize optical loss.

In view of the foregoing, it would be desirable to provide a method and apparatus for aligning a chip to a substrate which overcomes the drawbacks of the prior art.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
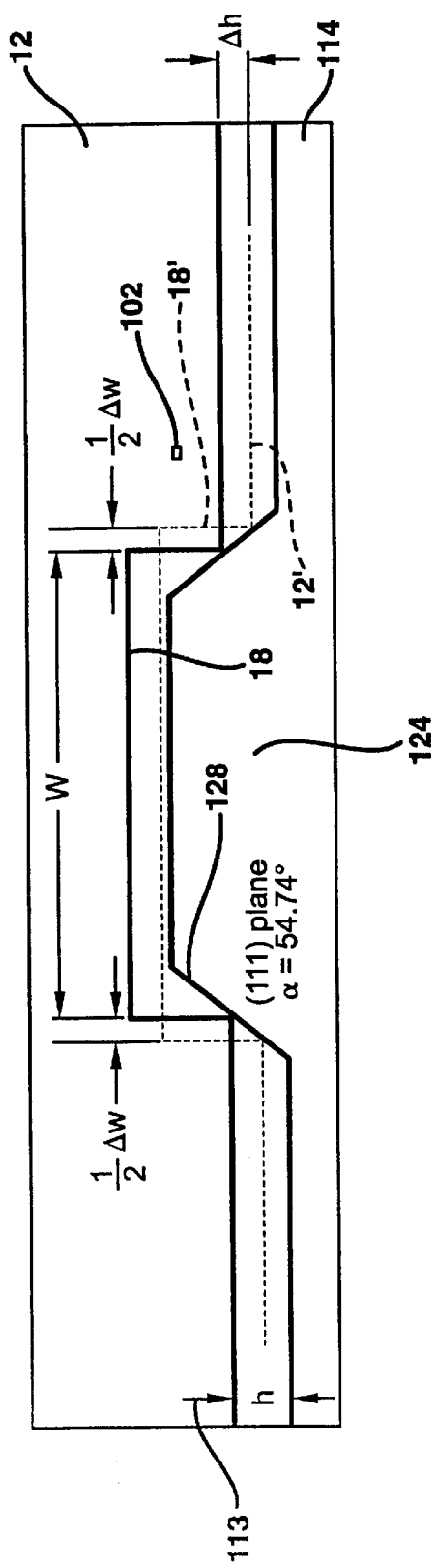
FIG. 1 is a side elevational view of an aligned pedestal within a recess of two coupled components.

The present invention is directed towards a method and apparatus for mechanically and electrically interconnecting an optoelectronic device with a substrate supporting optical components thereon. In accordance with the teachings of the present invention, and referring to FIG. 2, an optical apparatus 10 includes a first chip having at least one recess 18 formed on the first chip, in the form of an optoelectronic/photonic device 12, at a pre-selected location. A second chip, in the form of an optical component supporting substrate 14, includes at least one projection 24 extending therefrom at a pre-selected location, wherein at least one of the recess and the projection includes angled walls 28 having an angle relative to the top of the wall less than 54.74° for capturing and directing the other of the at least one recess 18 and the at least one projection 24 for aligning the first chip to the second chip. The substrate 14 is preferably a (1,0,0) oriented silicon motherboard useable for hybrid integration. After flip-chip assembly, the optoelectronic/photonic device 12 is disposed opposite the optical component supporting substrate 14. Even though only one recess 18 is shown for clarity, the device 12 includes a body 16 normally having a plurality of recesses 18 to align the rest of the body 16 in a stable X-direction alignment. The recesses 18 are preferably formed at pre-selected locations relative to an optical waveguide 102 buried within the body 16. Optionally, a bonding material, such as adhesive (not shown) is used for bonding between the two chips. If desired, and in case of an active component, a conductive adhesive could be used instead to mechanically and electrically interconnecting the device 12 with the substrate 14. Alternatively, a plurality of bonding or solder pads 20 are also coupled to the body 16 and are also located at positions that can be referenced to the optical waveguide 102.

Even though only a portion of the substrate 14 having one projection 24 is shown for clarity, the substrate 14 includes a base 22 preferably having a plurality of projections 24 extending therefrom to provide a stable X-direction alignment. The projections 24 are preferably located at pre-selected locations relative to a corresponding receiving section (not shown) on another portion of the substrate 14 for optically coupling to the waveguide 102. Optionally, as with the device 12, a plurality of bonding or solder pads 26 are coupled to the base 22 which can also be referenced locationwise to the corresponding receiving section. The locations of projections 24 are selected to match or otherwise correspond with the locations of the recesses 18 in the device 12, such that the angled walls 28 of the projections 24 can engage the device 12 adjacent the recesses 18. According to the teachings of the present invention, the orientation of the device 12 relative to the substrate 14 is better controlled by varying the pitch of the angled walls 28 from the conventional slope angle of 54.74° to a less steep slope angle, such as the 25.24° for a (3, 1, 1) face bearing of a silicon pedestal on a (1,0,0) silicon motherboard, in order to allow a better tolerance compensation for a width variation of the recesses 18. The use of such an obtuse angle, referenced from the top plane of the substrate 14 limits mis-positioning in the vertical (Z) direction. Assuming the same recess inaccuracy of +/−2 $\mu$m of FIG. 1, the improved vertical positioning variation or height error $\Delta h$ would reduce to +/−0.47 $\mu$m in FIG. 2.

If adhesives or another type of bonding material is not used, a bonding member, optionally, in the form of a solder bond 30 is coupled between each of the solder pads 20 and solder pads 26 to interconnect the device 12 and substrate 14. Advantageously, the surface tension of the solder bonds 30 is used during reflow to move the device 12 relative to the substrate 14 while alignment of the device 12 relative to the substrate 14 is controlled by the interaction of the projections 24 with the device 12 adjacent the recesses 18.

The plurality of recesses 18 is provided preferably by dry-etching techniques. The diameter of the recesses 18 is dependent on the photolithography and etch parameters. Anisotrophic etching of the device 12 combined with high accuracy lithography is preferred to achieve precise formation of the recesses 18.

The solder pads 20 are then coupled to the device 12. The under bump metallurgy and the solder pads 20 can be fabricated using a variety of techniques. For example, the solder pads 20 are preferably formed using a combination of photolithography and evaporation/electroplating.

The projections 24 are formed on the substrate 14 preferably by chemical or wet etching techniques. The selection of the material for the substrate 14 is very important for achieving the desired geometry. Precisely formed, slanted projections 24 have been achieved in a substrate 14 made of silicon using chemical etching techniques. The angle of the projections 24 or slope of the sidewall 28 is controlled by the (3,1,1) face bearing crystalline structure of the silicon and is dependent on the known two-step or maskless chemical etching process.

The solder pads 26 are then coupled to the substrate 14. The solder pads 26 can be formed using a combination of photolithography and evaporation/electroplating.

The placement of the projections 24 on the substrate 14 and the recesses 18 on the device 12 with respect to the solder pads 20 and solder pads 26 is arbitrary. However, the number of projections 24 and recesses 18 is preferably optimized so that friction between the projections 24 and the device 12 adjacent the recesses 18 does not interfere with the vertical and horizontal surface tension restoring forces of the solder bonds 30.

The assembly sequence involves positioning the device 12 on the substrate 14 such that the solder bonds 30 are interposed between the solder pads 20 and solder pads 26. If desired, heat and pressure can be applied for a short period of time at this point for tacking the device 12 to the substrate 14 via the solder bond 30. Due to the geometry of the device 12 and substrate 14, the projections 24 should now roughly align with the recesses 18. A pick and place machine is preferably employed for the above described initial placement process.

After the device 12 is positioned over the substrate 14, the apparatus 10 is subjected to a reflow cycle. During the reflow cycle, the solder bond 30 melts allowing the apparatus 10 to collapse in height. During the collapse, the projections 24 engage the device 12 adjacent the recesses 18 and guide the movement of the device 12 relative to the substrate 14. The geometry of the steeper projections 24 and recesses 18 define the improved alignment accuracy of the device 12 relative to the substrate 14.

In a high volume manufacturing environment, a pick and place machine is used to initially position the device 12 on the substrate 14. The apparatus 10 is then transferred to a conventional reflow oven to melt the solder bond 30. It is very important that the device 12 stay in place relative to the substrate 14 during the transfer between the pick and place machine and the reflow oven and also through the initial stages of reflow. The above described geometry locks and tacks the device 12 in place relative to the substrate 14 during these stages without the need for flux or any organic or inorganic tacking material. Further, movement of the device 12 relative to the substrate 14 during reflow is constrained by the interaction of the projections 24 and recesses 18.

Functionally, the X, Y, and Z alignment of the device 12 relative to the substrate 14 is controlled by the configuration of the projections 24 on the substrate 14 and the recesses 18 of the device 12. Assuming the desired height (h) alignment 113 of FIG. 1 is still desired in FIG. 2, the larger recess 18' allows the device 12' to be positioned too much closer to the substrate 114 in FIG. 1, below the minimum height requirement 113 than the recess 18 of the device 12 is prevented from falling too much lower by the more slanted projection 24 of FIG. 2. However, the trapezoidal or pyramidal shape of the projection 24 and the corresponding rectangular shape of the recesses 18 and 18' maintain a constant orientation of the device 12 relative to the substrate 14 in the X and Y directions. Advantageously, an incorrectly sized recess 18' results in a much smaller misalignment in the Z direction only and no misalignment in the X and Y directions.

Figure 2:
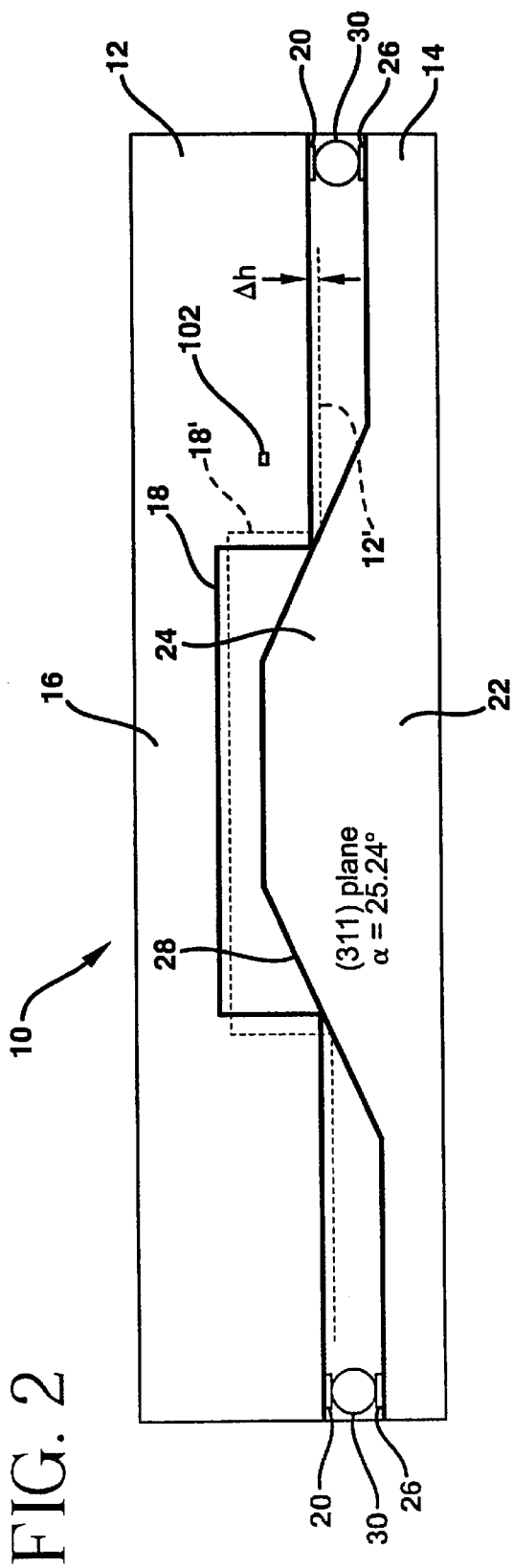
FIG. 2 is a side elevational view of an aligned, tacked, and bonded optoelectronic/photonic device and matching substrate, according to the present invention.

The angled walls 28 of the projection 24 in FIG. 2 enable the alignment of the device 12 to the substrate 14 to be nearly insensitive to the width and height variation of the recess 18 as illustrated by the alternate projection 18'' of the device 12' shown in phantom.

It is to be noted that either the device or substrate is provided with projections while the other is provided with the complementary recesses. At least one of the projections and recesses is provided with angled walls for capturing and directing the other. For example, in FIG. 3, the projections on one chip can be substituted with recesses with the other chip having the corresponding receiving feature, such as a projection or pedestal.

Figure 3:
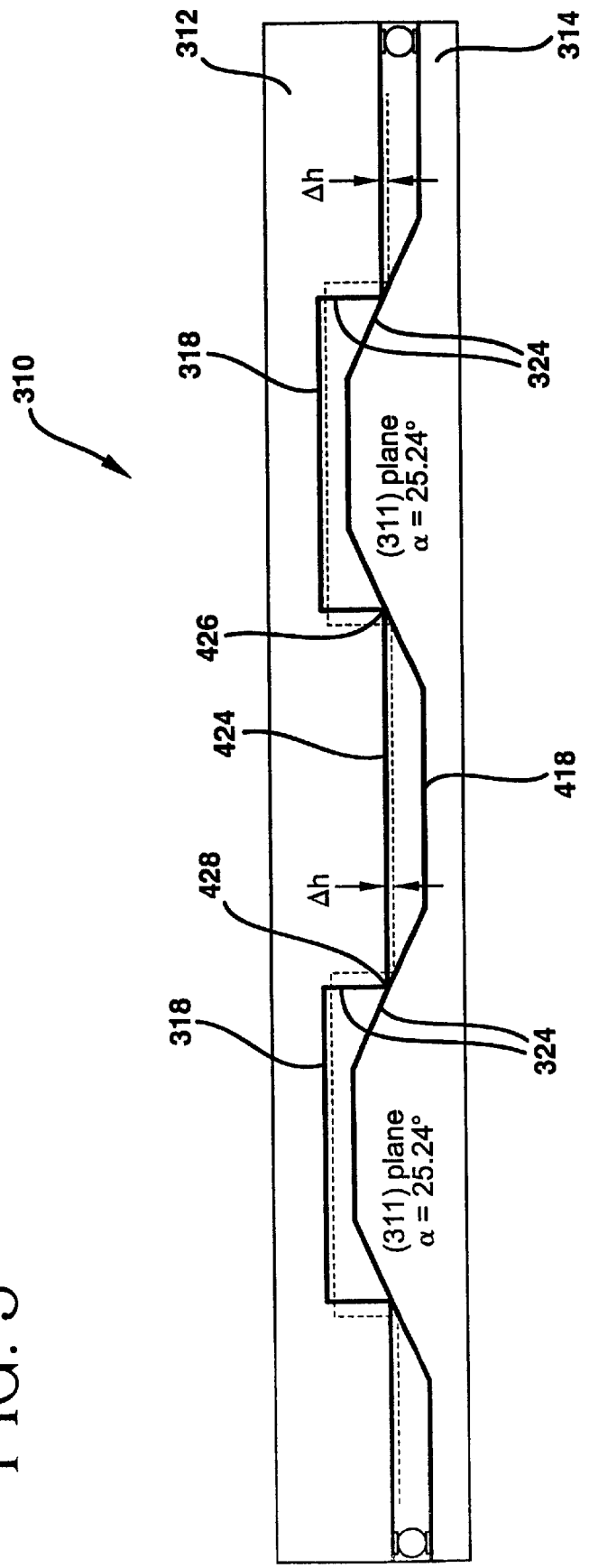
FIG. 3 is a side elevational view of an alternate embodiment of the device and substrate, according to the present invention.

Referring now to FIG. 3, which is basically FIG. 2, flipped upside down and duplicated to show the plurality of recesses and projections, an alternate embodiment of the invention is shown. An optical apparatus 310 includes a first chip having at least one recess 418 formed on the first chip, in the form of an optoelectronic/photonic device 314, at a pre-selected location. A second chip, in the form of an optical component supporting substrate 312, includes at least one projection 424 extending therefrom at a pre-selected location, wherein the recess 418 includes an angled wall 28 having an angle relative to the top of the wall less than 54.74° for capturing and directing the projection 424 for aligning the first chip to the second chip.

Viewing the optical apparatus 310 in another way, the first chip has at least one recess 318 formed on the first chip, in the form of an optical component supporting substrate 312, at a pre-selected location. A second chip, in the form of an optoelectronic/photonic device 314, includes at least one projection 324 extending therefrom at a pre-selected location, wherein the projections 324 include angled walls 328 having an angle relative to the top of the wall less than 54.74° for capturing and directing the movement between the recesses 318 and the projections 324 for aligning the first chip to the second chip. As long as there are two corners in the shape of the projection to provide at least two contact points 426 and 428, the projection 324 can be rectangular, conical, triangular with the base facing upwards as in a funnel, or any other shape that could be suitably inserted into the slanted recess 418.

Even though the currently preferred approach is to form the pedestal on the platform and not on the opto-electronic component because fabricating a Silicon platform with a slanted pedestal having an angle of 25.3° by chemical etching in a KOH bath is possible, the scope of the present invention is not so limited. Defining the recesses on the optical components, made from Silicon, to be flip chipped can also be done currently by dry or wet etching. Thus, the present invention teaches the use of a slanted pedestal with (311) oriented sidewalls, preferably on Silicon, which can be implemented in many forms.

Currently, slanted pedestals on the opto-electronic component (made of InP or Silica) with KOH etching is not used because KOH etching works best with Silicon. However, as technology progresses, the alternative implementation using the slanted pedestal formed, instead on the opto-electronic component and the recess, made on the platform, for certain desired applications, would be a simple modification that will become apparent to the skilled practitioner upon study of the present invention.

Figure 4:
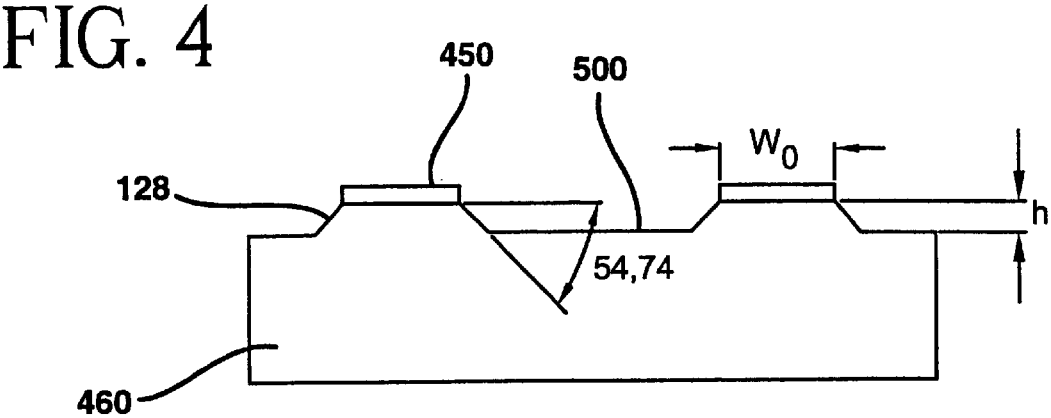
FIG. 4 is a side elevational view of the first etching step in formation of the projection 24 of FIG. 2, on a Silicon wafer, according to the present invention.
Figure 5:
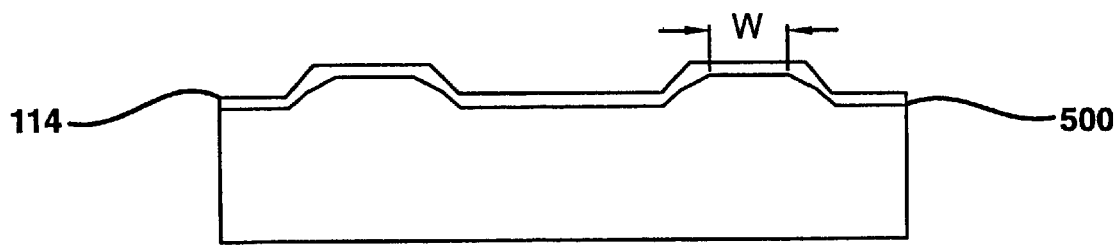
FIG. 5 is a side elevational view illustrating mask removal and a second etching of the projections on the wafer of FIG. 4, according to the present invention.
Figure 6:
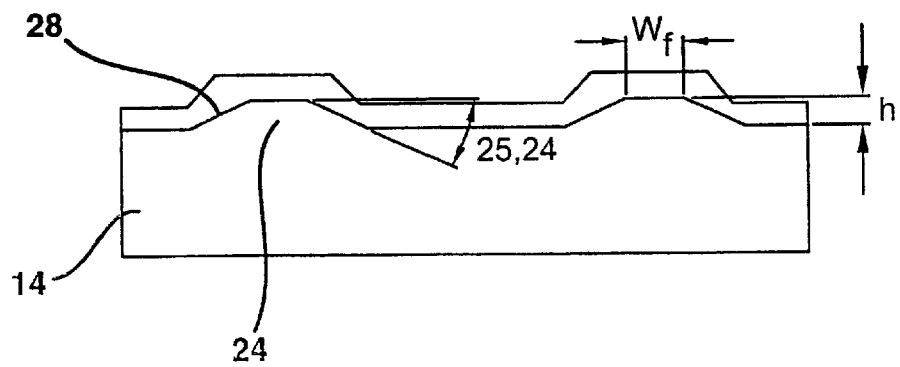
FIG. 6 is a side elevational view illustrating the definition of the projections of FIG. 5 by the (3, 1, 1) crystallographic plane after the second etching stops, according to the present invention.

Referring to FIGS. 4–6, the steps to chemically develop the (3, 1, 1) oriented plane 28 of FIG. 2 is illustrated. In general, the method to chemically develop the (3, 1, 1) oriented plane in a silicon (Si) wafer is known and has been used in developing three-dimensional structures and stops into V-grooves. However, it has not been used to develop the silicon motherboard (3, 1, 1) projection 24 of FIG. 2 for hybrid integration to make slanted pedestals suitable for flip-chip bonding.

The known method includes a two-step chemical etching, also called a maskless etching process. In a first step, a dielectric mask 450 is patterned on the (1, 0, 0) silicon wafer 460. However, according to the teachings of the present invention, the mask pattern has to be wide enough to define the initial width $w_o$ that is large enough for further width reduction. The chemical etching is allowed to be performed down to a given depth. Using a chemical solution based on KOH in FIG. 4, the typical (1, 1, 1) crystallographic plane or oriented sidewalls 128 are developed with an angle of 54.74° with respect to the (1,0,0) plane and the height (h) of the sidewall is defined and fixed in this first etching step. As an example, the height (h) is fixed at 15 μm with an initial width $w_o$ of about 48 μm. As in the conventional steps, the dielectric mask 450 is removed in FIG. 5 to result in the conventional substrate 114 of FIG. 1. However, according to the teachings of the present invention, etching is resumed and overlapped on the same previously etched (1,0,0) plane after mask removal in the step of maskless etching in FIG. 5. During this maskless etching of FIG. 5, the (3, 1, 1) oriented sidewalls whose etching rate is fast can be laterally developed, while the (1, 0, 0) and remaining (1, 1, 1) planes in the sidewalls and on top 500 of the wafer are further etched down. Because the etching rate of the (3,1,1) plane is much faster than the rate of the (1, 1, 1) plane, the (1, 1, 1) planes finally disappear to result in a projection or pedestal with only the (3, 1, 1) oriented sidewalls 28 as precisely defined by the (3, 1, 1) crystallographic plane in FIG. 6. The precise angle definition of the sidewall 28 thus depends on the chemical etching condition on any wafer mis-orientation with respect to the (1, 0, 0) plane direction which must be well-controlled. However, the chemical undercut that must be well-controlled for the (1, 1, 1) oriented pedestals is eliminated. As part of the same example, the final width $w_f$ has now been reduced to about 20 μm preferably, or at least a width less than 25 μm.

Thus, an apparatus and method are provided for aligning an optoelectronic/photonic device relative to a substrate. Either the device or substrate is provided with a slanted projection or recess that is less steep than 54.74° while the other is provided with a complementary recesses or projection, respectively. Hence, at least one of the projections and recesses is provided with angled walls, preferably slanted at a 25.24° angle for capturing and directing the other in a much vertical tolerant self-alignment method.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An optical apparatus comprising:
   a first chip having at least one recess formed therein at a pre-selected location; and
   a second chip having at least one projection extending therefrom at a pre-selected location, wherein at least one of the at least one recess and the at least one projection includes angled walls having an angle relative to the top of the wall less than 54.74° for capturing and directing the other of the at least one recess and the at least one projection for aligning the first chip to the second chip.

2. The apparatus of claim 1 wherein the angled walls are defined in a (100) oriented Silicon wafer, and have a (3, 1, 1) face bearing.

3. The apparatus of claim 1 wherein the second chip comprises a silicon motherboard having the angled walls of a (3, 1, 1) face bearing such that said first chip aligns relative to the silicon motherboard.

4. The apparatus of claim 1 wherein the angled walls have a (3, 1, 1) face bearing such that said first chip aligns relative to said second chip with a vertical tolerance.

5. The apparatus of claim 1 wherein the angled walls have a (3, 1, 1) face bearing such that said first chip aligns relative to said second chip with a vertical tolerance of +/−0.47 μm when the recess tolerance is +/−2 μm.

6. The apparatus of claim 1 wherein the angled walls have a width of less than 48 μm.

7. The method of claim 1 wherein the angled walls have a width of less than 48 μm and a height of at least 25 μm.

8. An optical apparatus comprising:

a first chip including a plurality of recesses formed therein at pre-selected locations; and a second chip including a plurality of projections extending therefrom at pre-selected locations, wherein at least one of said plurality of recesses and said plurality of projections includes angled walls having an angle relative to the top of the wall less than 54.74 degrees for capturing and directing the other of said plurality of recesses and said plurality of projections during alignment between said first chip and said second chip.

* * * * *